(12) United States Patent
Wernberg et al.

(10) Patent No.: US 6,981,359 B2
(45) Date of Patent: Jan. 3, 2006

(54) CENTRIFUGAL PUMP FUEL SYSTEM AND METHOD FOR GAS TURBINE ENGINE

(75) Inventors: Donald E. Wernberg, Rockford, IL (US); Paul J. Schaefer, Loves Park, IL (US); Edward L. Hommema, Rockford, IL (US)

(73) Assignee: Woodward Governor Company, Fort Collins, CO (US)

( * ) Notice: Subject to any disclaimer, the term of this patent is extended or adjusted under 35 U.S.C. 154(b) by 164 days.

(21) Appl. No.: 10/463,701

(22) Filed: Jun. 16, 2003

(65) Prior Publication Data

US 2005/0223690 A1  Oct. 13, 2005

(51) Int. Cl.
*F02C 9/26* (2006.01)
(52) U.S. Cl. .................... 60/39.281; 60/734
(58) Field of Classification Search ............. 60/39.281, 60/734
See application file for complete search history.

(56) References Cited

U.S. PATENT DOCUMENTS

| | | | |
|---|---|---|---|
| 4,458,713 A | 7/1984 | Wernberg | |
| 4,716,723 A | 1/1988 | Ralston et al. | |
| 5,111,653 A | 5/1992 | Leeson | |
| 5,433,237 A | 7/1995 | Kao et al. | |
| 5,845,484 A * | 12/1998 | Maker | 60/39.281 |
| 6,135,135 A | 10/2000 | Futa, Jr. et al. | |
| 6,272,843 B1 * | 8/2001 | Schwamm | 60/39.281 |
| 6,328,056 B1 | 12/2001 | Kumar et al. | |
| 6,381,946 B1 | 5/2002 | Wernberg et al. | |
| 2001/0054290 A1 * | 12/2001 | Herbison et al. | 60/734 |

\* cited by examiner

*Primary Examiner*—Louis J. Casaregola
(74) *Attorney, Agent, or Firm*—Reinhart Boerner Van Deuren P.C.

(57) ABSTRACT

A fuel system for a gas turbine engine that utilizes a centrifugal pump. The system includes a fuel metering valve that is adapted to set a metered flow of fuel, and a throttle valve that is adapted to accurately control pressure drop across the fuel metering valve. The throttle valve has at least two variable orifices and a compensation chamber between the variable orifices. The throttle valve includes a differential valve piston slidable in a valve body. The differential valve piston comprises working surfaces of at least two different diameters such that changes in chamber pressures effect different axial forces upon the piston.

30 Claims, 6 Drawing Sheets

CENTRIFUGAL PUMP FUEL SYSTEM AND METHOD FOR GAS TURBINE ENGINE

FIELD OF THE INVENTION

This invention pertains to gas turbine fuel systems and more particularly to gas turbine fuel systems that use high pressure centrifugal pumps.

BACKGROUND OF THE INVENTION

There are two types of high pressure fuel pumping systems for gas turbine engines. The first type utilizes a positive displacement pump (typically a gear pump). The other type utilizes a centrifugal pump. The fuel metering units for these types of fuel systems are substantially different in design, application and practice due to the fact that positive displacement pumps provide a predetermined flow rate based on pump speed (a flow generation source), whereas a centrifugal system generates pressure (a pressure generation source) proportional to pump speed squared.

Examples of positive displacement pump fuel metering systems are disclosed in U.S. Pat. No. 4,458,713 to Wernberg, U.S. Pat. No. 5,433,237 to Kao et al., and U.S. Pat. No. 6,381,946 to Wernberg et al. In these systems, the speed of the pump determines the fuel flow supplied to the fuel metering unit. For positive displacement systems, it is necessary for the fuel metering unit to recirculate (e.g. bypass and return) a portion of the pumped fuel flow back to the inlet of the high pressure pump. This is due to the fact that the pump is sized large enough to provide enough fuel flow to meet the maximum demanded fuel flow rates for the gas turbine engine.

Centrifugal pumps, by contrast do not provide a predetermined flow rate based upon speed. The fuel metering unit for centrifugal pumping systems throttles (restricts) pump flow rather than bypasses flow.

Referring to a prior art centrifugal system schematically shown in FIG. 1, which generally depicts the relevant portions of a typical centrifugal pump type engine fuel system, the engine fuel system includes a fuel tank and a low pressure centrifugal boost pump. The boost pump supplies fuel to a variable displacement starting pump and to two high speed centrifugal pumps, one for the core engine and the other for the afterburner. The fuel for the high speed centrifugal pump for the core engine is controlled with a fuel metering valve that is positioned by an electrohydraulic servovalve (EHSV), which is turn in controlled by the FADEC (full authority digital electronic controller). A position sensor (such as a LVDT or linear variable displacement transducer) provides metering valve position feedback to the FADEC. A throttle valve is arranged in series with the metering valve. The throttle valve provides a variable restriction orifice in the fuel flow path that controls the pressure drop across the fuel metering valve (at 50 PSI for example). The throttle valve opens and closes the variable restriction orifice to maintain the pressure drop constant. To keep the metering valve pressure drop constant with excellent accuracy as is typically desired, the system of FIG. 1 employs a pressure sensor which typically contains a bellows or diaphragm that senses pressure drop across the fuel metering valve. Typically, this pressure sensor positions a low friction, low flow first stage valve which in turn positions the larger throttle valve. This is mathematically an integrating type system as flow from the first stage valve is integrated by the second stage throttle valve piston until the error in the predetermined pressure drop is zero.

Unfortunately, incorporating the plumbing, multiple stages, valves and sensors to provide accurate control over metering valve pressure drop accuracy such as that schematically illustrated in FIG. 1 has added substantial weight, size, and expense. It has also reduced dynamic performance, stability and the reliability of centrifugal pump metering systems. These are all disadvantages, particularly in aircraft applications where there is always a constant desire to reduce weight while maintaining or increasing performance and reliability.

BRIEF SUMMARY OF THE INVENTION

It is a general objective of the present invention to provide an improved centrifugal pump metering system for gas turbine engine fuel metering units utilizing high pressure centrifugal pumps.

In accordance with this general objective, one aspect of the present invention is directed toward an improved fuel system for a gas turbine engine that pumps fuel utilizing a high pressure centrifugal pump that pumps fuel from a fuel supply. The system includes a fuel metering valve that is adapted to set a metered flow of fuel, and a throttle valve that is adapted to control pressure drop across the fuel metering valve. The high pressure centrifugal pump, the fuel metering valve, and the throttle valve are arranged in fluidic series with the nozzle outlet passage, which is adapted to convey fuel to the gas turbine engine for discharge and combustion. The throttle valve has at least two variable orifices and a compensation chamber which senses the pressure between the variable orifices. The throttle valve is movable to simultaneously change degrees of opening of the variable orifices. When the gas turbine engine and fuel system are operating, fuel pressure in the compensation chamber acts upon the throttle valve to control the position of the throttle valve.

It is a further aspect of the present invention that the throttle valve includes a multiple diameter valve piston slidable in a valve body. The valve piston comprises working surfaces of at least two different diameters such that changes in chamber pressures effect different axial forces upon the piston. The valve piston may comprise first and second lands in spaced axial relation such that the throttle valve defines at least three chambers, including a first chamber subjected to fluid pressure upstream of the fuel metering valve, a second chamber subjected to fluid pressure downstream of the fuel metering valve, and the compensation chamber intermediate of the two variable orifices. The compensation chamber is arranged in fluidic series with the fuel metering valve and the nozzle outlet passage whereby fuel flows through the compensation chamber to the nozzle outlet passage.

It is an advantage that the compensation chamber may be used to counteract variances in forces that can occur due to changes in valve position. For example the valve experiences different amounts of fluid flow forces (namely, Bernoulli forces) and spring forces at different valve positions. Changes in fluid pressure in the compensation chamber can be designed to compensate for changes in spring forces and/or naturally occurring fluid forces such as Bernoulli forces that may be generated by fluid flowing through the throttle valve.

Another aspect of the present invention is directed toward a fuel metering unit that can be used in a fuel system for regulating fuel flow in a gas turbine engine pressurized by a high pressure centrifugal pump and delivered to a nozzle outlet passage. The fuel metering unit comprises a fuel metering valve and a throttle valve arranged in fluid series.

The throttle valve comprises a valve body, a valve member and at least two variable orifices. The valve member is movable in the valve body to vary the size of the variable orifices. The variable orifices are arranged in fluidic series with a compensation chamber defined therebetween such that a fluid control pressure develops in the compensation chamber when fuel flows through the throttle valve. Fluid control pressure which is developed in the compensation chamber acts upon the valve member to control position of the valve member.

Other aspects, objectives and advantages of the invention will become more apparent from the following detailed description when taken in conjunction with the accompanying drawings.

DETAILED DESCRIPTION OF THE INVENTION

Figure 2:
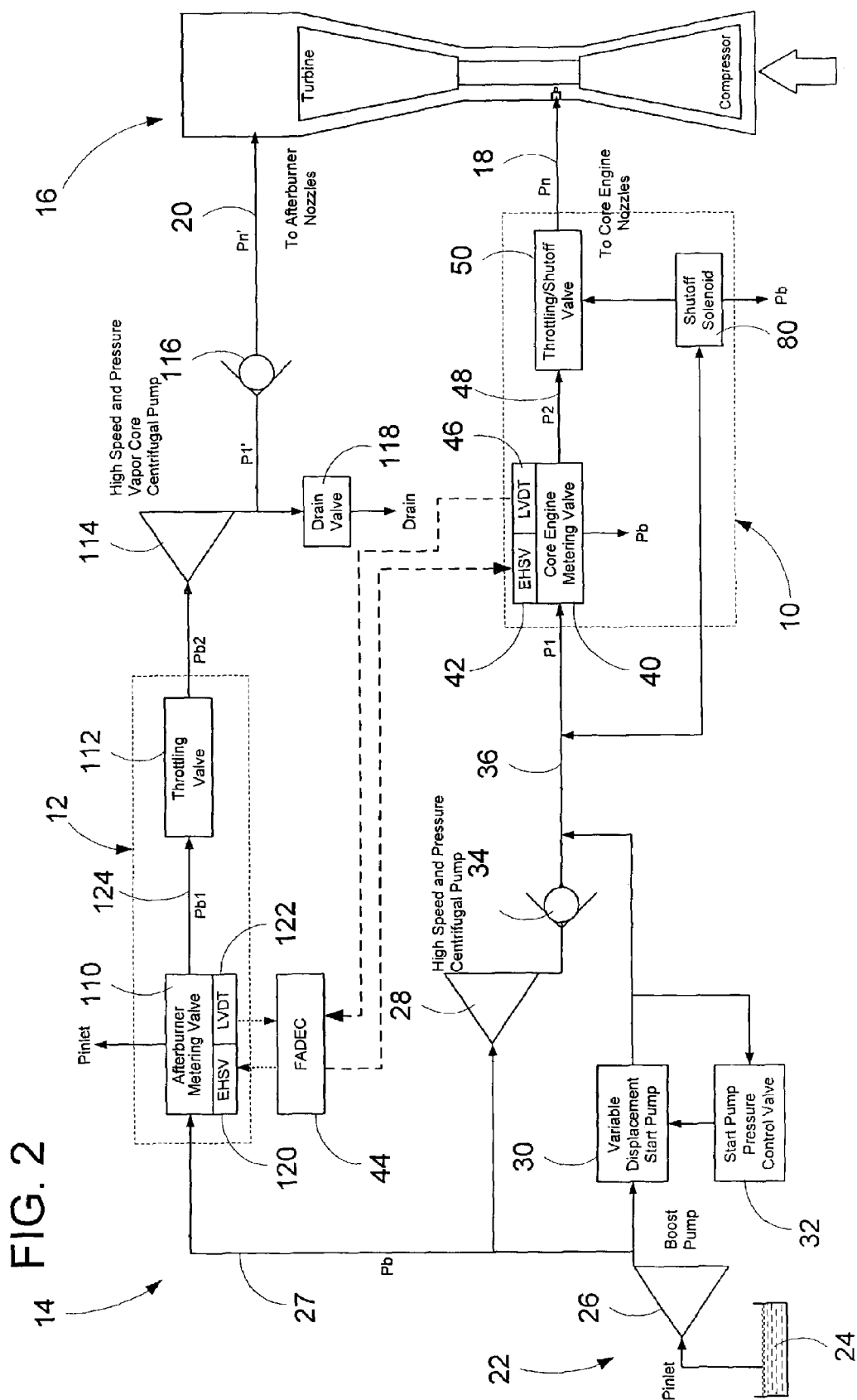
FIG. 2 is a schematic representation of a centrifugal pump fuel system incorporating different fuel metering units for both the afterburner and core sections of a gas turbine engine according to an embodiment of the present invention.

Referring to FIG. 2, two different fuel metering units 10, 12 according to two different embodiments of the present invention are illustrated for a fuel delivery system 14 for a gas turbine engine 16 according to an embodiment of the present invention. One of the fuel metering units 10 meters core engine fuel flow and is arranged to control primary fuel flow along a nozzle outlet passage 18 leading to nozzles that discharge into the core of the gas turbine engine 16. The other fuel metering unit 12 meters afterburner fuel flow and is arranged to control fuel flow through a nozzle passage 20 leading to afterburner nozzles. As illustrated, the main fuel metering unit 10 and the after burner unit 12 are arranged in a parallel fluid circuit. It will be appreciated that many aircraft and gas turbine engines do not include afterburner systems, and the invention is applicable and covers these fuel delivery systems as well.

The fuel delivery system 14 includes a fuel supply 22 comprising a fuel tank 24 and a low pressure centrifugal boost pump 26. The boost pump 26 supplies fuel to each of the afterburner fueling system and the core turbine fueling system. The booster pump 26 generates a low pressure source Pb in a first conduit network section 27.

The core turbine fueling system includes a high pressure centrifugal pump 28 that pumps fuel toward the nozzle outlet passage 18. A starting pump system is provided to pump fuel flow at low engine speeds when starting the gas turbine engine. The starting pump system includes a small variable displacement starting pump 30 in parallel circuit with the centrifugal pump 28. The variable displacement start pump 30 pumps the fuel during initial engine startup when the engine speed is slow and the high pressure centrifugal pump 28 is unable to generate sufficient pressure and/or flow. A control valve 32 is also provided to sense pressure or flow to control operation of the start pump 30, such that the start pump 30 may disengage or otherwise may stop pumping fuel upon a predetermined pressure representing adequate engine speed. A check valve 34 arranged downstream of the high pressure centrifugal pump 28 prevents fuel from backflowing through the centrifugal pump 28 at engine start up when the speed is slow.

In either event, the centrifugal pump 28 and/or the start pump 30 generate a high pressure source Ps/P1 in a second conduit section 36 that leads toward the core of the gas turbine engine.

Figure 1:
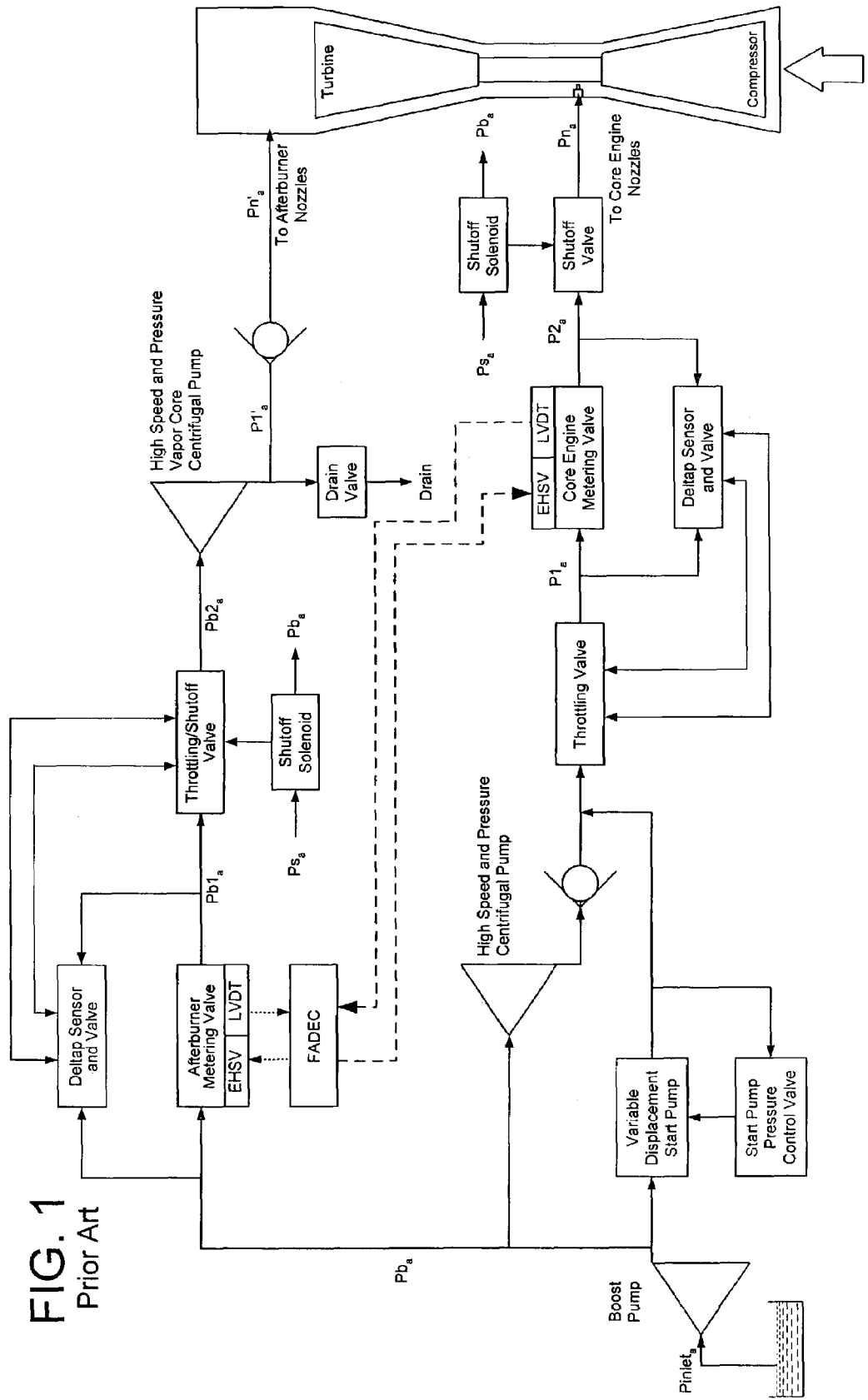
FIG. 1 is a schematic representation of the relevant portions of a centrifugal pump engine fuel system as may be found in a military afterburning fighter engine.

A fuel metering valve 40 is arranged in fluid series with the centrifugal pump 28 to meter fuel flow through the nozzle outlet passage 18. In this embodiment the fuel metering valve 40 is arranged downstream of the high pressure centrifugal pump 28. The position of the fuel metering valve 40 is set with a suitable servo-controller. For example, as shown in FIG. 1, an electro-hydraulic servo-valve (EHSV) 42, which is in turn controlled by the full authority digital electronic controller (FADEC) 44 as schematically indicated. Also, preferably, closed loop control is provided over the fuel metering valve 40 with a position sensor indicated as a linear variable displacement transducer (LVDT) 46 providing electronic position feedback to the FADEC 44. The position of the fuel metering valve 40 sets the fuel flow rate flowing through the fuel metering valve 40 to the nozzle outlet passage 18. A small but significant pressure drop is also developed across the fuel metering valve 40 during operation (typically in a range of about 30–70 psi, but it could be significantly higher) which results in a reduced pressure P2 in a third conduit section 48.

Figure 3:
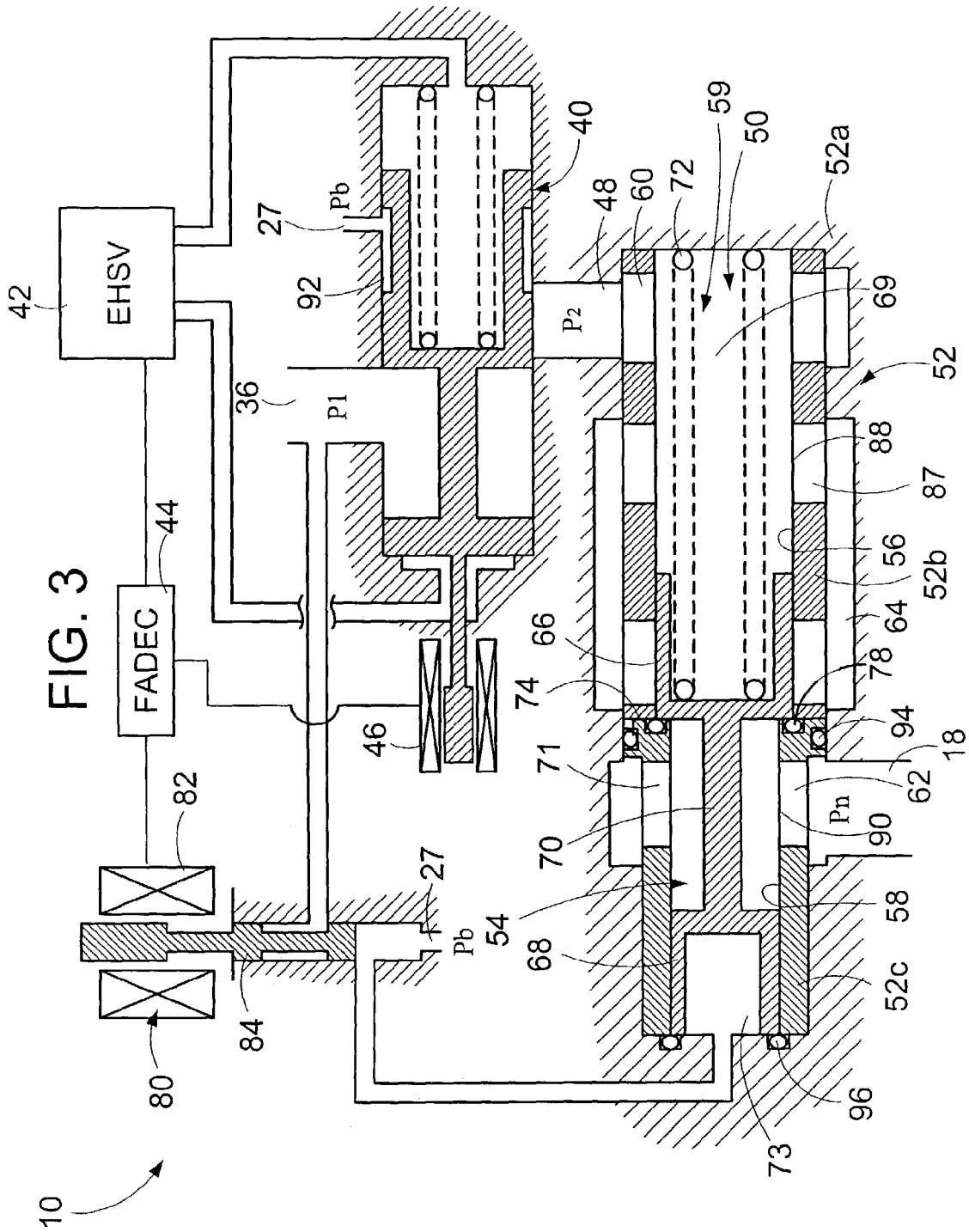
FIG. 3 is a cross sectional view shown partly in schematic form of the fuel metering unit schematically illustrated in FIG. 2 for the core section of a gas turbine engine, with the throttle valve and metering valve in the closed position.

A throttle valve 50 is arranged in fluid series with the fuel metering valve 40 and the centrifugal pump 28 to regulate pressure drop across the fuel metering valve 40. In this embodiment the throttle valve 50 is arranged downstream of the high pressure centrifugal pump 28 and the fuel metering valve 40. The throttle valve 50 includes a valve body 52 and a movable valve member shown as a multiple diameter piston 54 (as shown in FIG. 3).

The valve body 52 may be comprised of an assembly of valve body components including an outer housing 52a (which may include one or more splits) and sleeve inserts 52b, 52c to provide for ready valve assembly. The valve body 52 defines a larger diameter bore 56 and a smaller diameter bore 58 to provide a valve body chamber 59 in which the piston 56 slides. The valve body 52 defines an inlet port 60, an outlet port 62, and a intermediate passage 64 through the valve body 52 connecting inlet and outlet ports 60, 62. The piston 52 includes a larger cylindrical land 66 and a smaller cylindrical land 68, which may be integrally connected by a shank portion 70 that provides for a fluid chamber therebetween. The combination of the piston 54 and the valve body 52 define three separate chambers including an inlet chamber 69, a compensation chamber 71, and an actuation chamber 73.

The inlet chamber 69 is fluidically connected to the third conduit section 48 and therefore receives metered fuel flow through the inlet port 60. No restriction is provided at the inlet port 60 and therefore the inlet chamber 69 is considered to be at pressure (P2). A spring 72 in the inlet chamber 69 acts upon the piston 54 and biases the piston 54 toward a closed position (as shown in FIG. 3) against a valve seat 74. The valve seat 74 may include an O-ring gasket 78 as shown to provide a seal and prevent leakage. Fluid pressure (P2) in the inlet chamber also acts upon the larger diameter land 66 also provides an axial force that urges the differential piston 54 toward the closed position.

Figure 4:
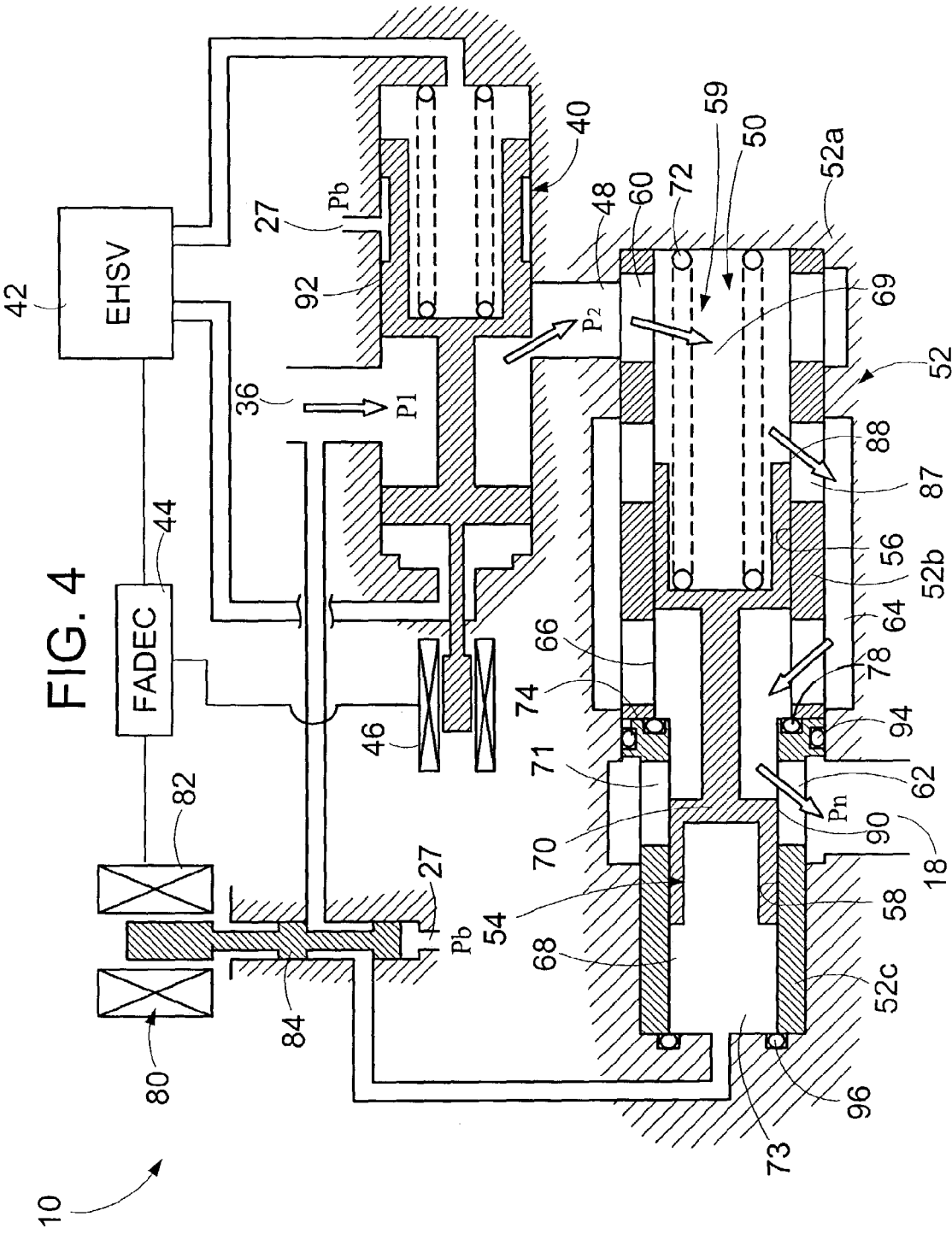
FIG. 4 is a similar view to that of FIG. 3, but with the throttle valve and metering valve in the open position.

At the other axial end, fluid pressure in the actuation chamber 73 acts in opposition to the force of the spring 72 and the fluid pressure (P2) in the inlet chamber 69. The fluid pressure in the actuation chamber 73 acts upon the smaller cylindrical land 68 to urge the differential piston 54 axially toward an open position (as shown in FIG. 4). A solenoid valve 80 acts as a switch to connect the actuation chamber 73 to a higher pressure conduit section 36 (at pressure P1) at the metering valve inlet or a lower sump pressure conduit section 27 (at pressure Pb). The solenoid valve 80 includes an electrical coil 82 that drives a spool valve 84. The electrical coil 82 is electrically connected to the FADEC 44 for control thereby. In operation, the FADEC 44 selectively sends signals to the solenoid valve 80 to pressurize the actuation chamber with pressure P1 or vent the actuation chamber to sump pressure Pb.

The relative diameters of the lands 66, 68 of the differential piston 54 are sized and the spring force sufficient such that the throttle valve 50 closes when the actuation chamber 73 is vented to the lower sump pressure conduit section 27 (at pressure Pb). This is shown in FIG. 3 where the solenoid valve 80 is positioned by the FADEC 44 to vent the actuation chamber to sump pressure Pb. In the closed position, the force of the spring 72 (and/or fluid pressure at P1) seats the differential piston 54 against the seat 74 and the O-ring gasket 78 and o-ring gasket 96 and thereby prevents fuel flow to the nozzle outlet passage 18. Thus, an advantage of the present invention is that the throttle valve 50 is biased to a closed position and thereby may be used to provide automatic shut-off upon engine shut down or when otherwise desired. An additional large shut-off valve does not need to be provided in series with the throttle valve 50, thereby providing for weight and size advantages.

Figure 5:
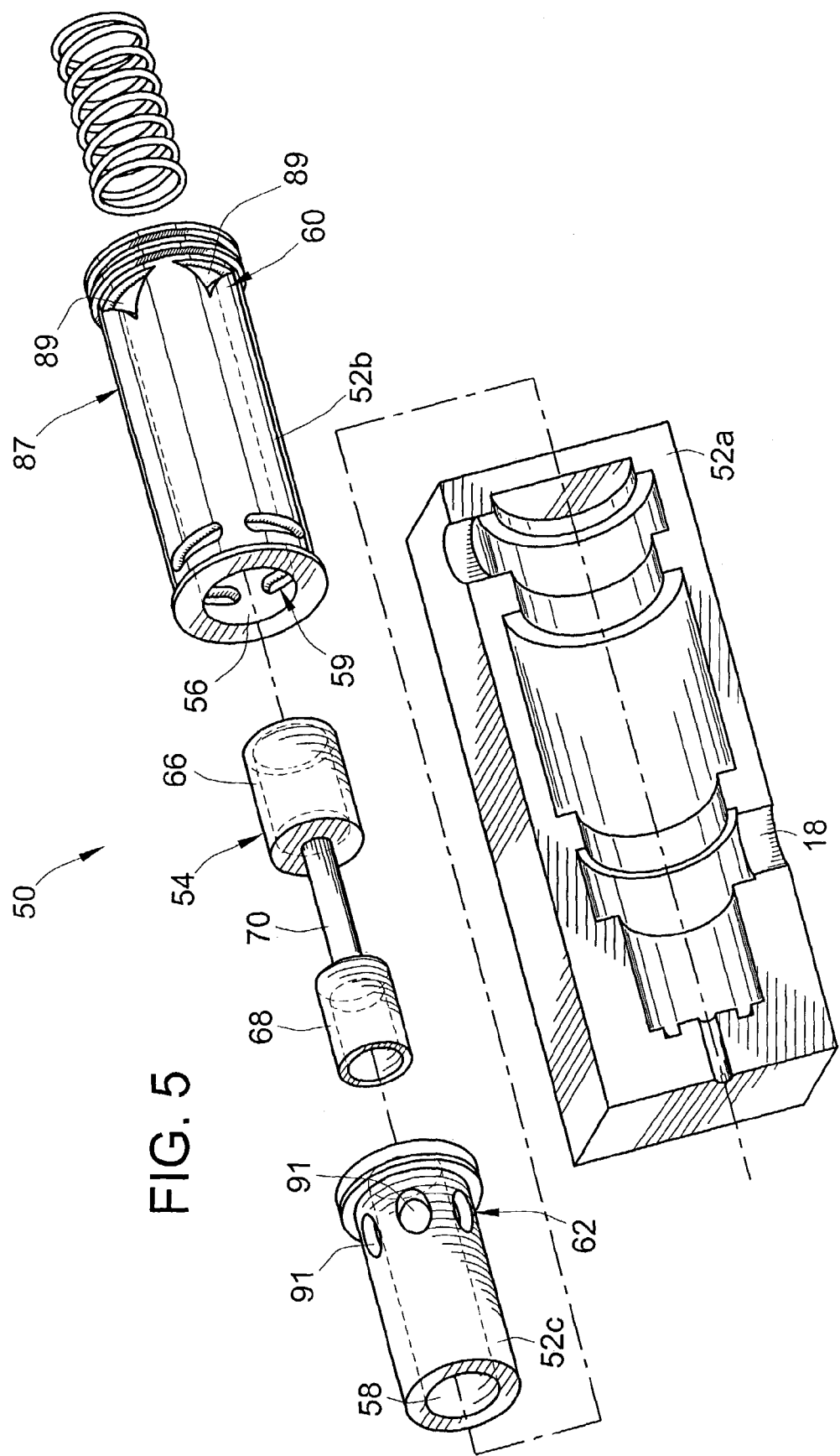
FIG. 5 is an exploded isometric representation of a throttle valve used in the fuel metering unit of FIGS. 2–4.

In the embodiment of FIGS. 3–4, and during operation, the larger cylindrical land 66 partially covers an intermediate port 87 disposed along the intermediate passage 64 to control size of and provide for a first variable restriction 88. As shown in FIG. 5, the intermediate port 87 may comprise several holes 89 formed into the larger valve body sleeve 52b. The smaller cylindrical land 68 partially covers the outlet port 62 to control size of and provide for a second variable restriction 90. The outlet port 62 may comprise several holes 91 formed into the smaller valve body sleeve 52c.

The first and second variable restrictions 88, 90 are arranged in fluid series in the throttle valve 50 between the nozzle outlet passage 18 (at pressure Pn) and the fuel metering valve. At selected positions of the throttle valve 50 a pressure drop is developed across the first restriction 88. This generates a reduced pressure Pcomp (that is less than P1 and P2) inside the throttle valve in the compensation chamber 71. This compensation pressure (Pcomp) is utilized to generate an axial compensation force on the valve piston 54. In this embodiment, the compensation pressure (Pcomp) is between the larger cylindrical land 66 and the smaller cylindrical land 68. Since the larger cylindrical land 66 has a larger working surface, more fluid pressure works upon the larger cylindrical land 66 as opposed to the smaller cylindrical land 68. The differential in working surface areas determines how much axial compensation force is provided by the compensation pressure (Pcomp). The forces on the valve can be represented by the following equation:

$$F = P_{comp} * (\Pi R_{1g}^2 - \Pi R_{sm}^2) + P_{actuation} * \Pi R_{sm}^2 - P_2 * \Pi R_{1g}^2 - \text{Spring Force} \pm \text{Fluid Force(s)}$$

where:
F=Axial Force on Valve Piston (which is zero when the valve is balanced)
$P_{comp}$=Compensation Pressure;
$P_{actuation}$=Actuation Pressure (either P1 or Pb depending upon state of solenoid valve);
$P_2$=Pressure in Inlet Chamber;
$R_{1g}$=Radius of larger diameter differential Piston Land;
$R_{sm}$=Radius of smaller diameter differential Piston Land;

The second variable restriction 90 provides a pressure drop to reduce the pressure from Pcomp inside the compensation chamber 71 to Pn, the pressure in the nozzle outlet passage 18. Thus, two different pressure drops occur across the throttle valve 50.

The present invention achieves a substantially constant pressure drop across the metering valve 40. To achieve this, the ports 62, 87 that restrict flow and form restrictions 88, 90 in the throttle valve 50 are configured to control pressure Pcomp in the compensation chamber 71 and thereby generate a controlled axial compensation force upon the piston 54. The shape, size and configuration of these ports 62, 87 (and more specifically porting holes 89, 91 as shown in FIG. 5) are selected to provide changes in compensation pressure that offset variances in spring forces generated by the spring 72 that occur as the throttle valve piston 54 moves axially and fluid flow forces that act upon the valve. Preferably the size of the restrictions 88, 90 (and thereby the variable porting orifices) change in flow area at different rates when the throttle valve moves between positions. Generally for most operational positions, the upstream variable orifice has a larger flow area than the downstream variable orifice during operation of the throttle valve (although there may be instances where this is not true). Spring force changes occur naturally since spring force is a function of position. The equation (Hooke's law) for determining changes in spring force is:

$$\Delta F = K * \Delta X$$

where:
$\Delta F$=the change in spring force;
K=the spring constant; and
$\Delta X$=the change in spring/valve axial position Likewise, naturally occurring fluid flow forces such as Bernoulli forces can change based upon changes in valve position. The present invention may be used to counteract changes in fluid flow forces in addition to counteracting changes in spring forces.

For engine starting, after sufficient pressure is available at the fuel control, the FADEC 44 issues a signal that moves the shutoff solenoid valve 80 to the run position. This connects the actuation chamber 73 to the second conduit section and therefore pressure P1. At the same time, the FADEC 44 issues a signal to the EHSV 42 that holds fuel metering valve 40 in the closed position. This temporarily connects the inlet chamber 69 to the sump pressure Pb through an annulus 92 formed into the fuel metering valve 40 that communicates with the supply conduit network section 27 (at pressure Pb). The annulus 92 connects pressure Pb with the inlet chamber 69 when the fuel metering valve 40 is in the closed position (see e.g. FIG. 3). This causes a substantial pressure drop to develop across the throttle valve 50 (for example P1–Pb may be about 250 PSI). In turn, this causes the differential piston 54 of the throttle valve 50 to move far to the right with the given orientation shown in the Figures effectively closing the outlet port 62 with the smaller diameter land 68 of the differential valve piston 54 (the throttle valve 50 wants to lower the metering valve pressure differential by throttling).

Shortly thereafter, the FADEC 44 then issues a signal to the EHSV 42 to drive the fuel metering valve 40 to a low metered flow position for engine starting. The opening of the fuel metering valve 40 connects the inlet chamber 69 to pressure P1 through the fuel metering valve 40 (which is quickly reduced somewhat to pressure P2 by the pressure drop across the fuel metering valve). Since the fluid pressure drop across the throttle valve 50 is now near zero psi, the spring force of spring 72 forces the differential piston 54 to the left (with the given orientation of the Figures) and thereby opens the throttle valve 50. This allows pressure drop across the fuel metering valve 40 to increase to a predetermined set point. For example, a pressure drop (P1–P2) across the fuel metering valve 40 of about 50 p.s.i. is typical for many applications.

The throttle valve 50 is now in regulation and is allowing metered fuel flow to flow therethrough to the nozzle outlet passage 18 and the core of the gas turbine engine 16. In performing its regulating function, the throttle valve will control the pressure drop (P1–P2) across the fuel metering valve 40 and maintain it substantially constant at the predetermined set point. In particular, if pressure P2 is too high as compared with pressure P1, that excess pressure is communicated to inlet chamber 69 tends to urge the throttle valve 50 further open which in turn relieves the pressure in the inlet chamber 69 and thereby reduces pressure P2. Similarly, if pressure P1 is too high as compared with P2, the excess pressure is sensed or communicated to the actuation chamber 73 which in turn restricts flow through the throttle valve 50 which increases pressure P2 to correct the variance in pressure drop from the predetermined set point.

As the throttle valve 50 repositions itself to maintain a constant pressure drop across the fuel metering valve 40, the force of the spring 72 changes due to axial movement. The pressure Pcomp generated in the compensation chamber 71 is configured to offset those spring force changes. Pressure Pcomp is designed through configuration of the variable restriction outlet port 62 and intermediate port 87 to counteract changes in the spring force of spring 72 due to axial valve repositioning. As such changes in the compensation pressure Pcomp is a function of change in axial position $\Delta X$. As noted previously, compensation pressure Pcomp may also be designed to counteract the fluid flow forces that may be experienced that would otherwise tend to create some error in addition to spring forces. The intent of the throttling valve is to maintain metering valve pressure drop (P1–P2) as constant as possible for the entire engine fuel flow operating envelope. If the engine speed versus fuel flow requirements are known for both engine acceleration and deceleration conditions, the possible combinations of inlet pressure P1, outlet pressure Pn, and P2 pressure can be mathematically determined by one of ordinary skill in the art. Substituting these values into the force balance and flow equations for the valve the compensating pressure in chamber 71 and port area 87 can be calculated to give nearly zero error in metering valve pressure drop (P1–P2).

For engine shutdown, the FADEC 44 issues a signal to move the shutoff solenoid valve 80 to the off position in which the actuation chamber 73 is vented to the supply conduit network section 27 at sump pressure Pb. At approximately the same time, the FADEC 44 issues a signal to the EHSV 42 to drive the fuel metering valve 40 to the closed position exposing the inlet chamber 69 to sump pressure Pb as well. Since fluid forces are now generally balanced across the throttle valve 50, the spring 72 takes over and drives the differential valve piston 54 closed against valve seat 74. The gasket 78 at the valve seat 74 prevents leakage to the outlet passage (as well as other strategically located seals 94, 96 which may be needed depending upon how many components make up an assembly for the valve body).

It is an advantage in viewing the embodiment of the invention for the core engine of FIGS. 2–5 that there is no need for a pressure sensor and integrating valve which are arranged in parallel with the fuel metering valve (schematically shown in FIG. 1). The present invention achieves good to excellent accuracy for maintaining a constant pressure drop across the fuel metering valve while also reducing weight and expense, and at the same time increasing dynamic performance, stability and reliability of the fuel system Some or all of these advantages can be obtained with the present invention.

Figure 6:
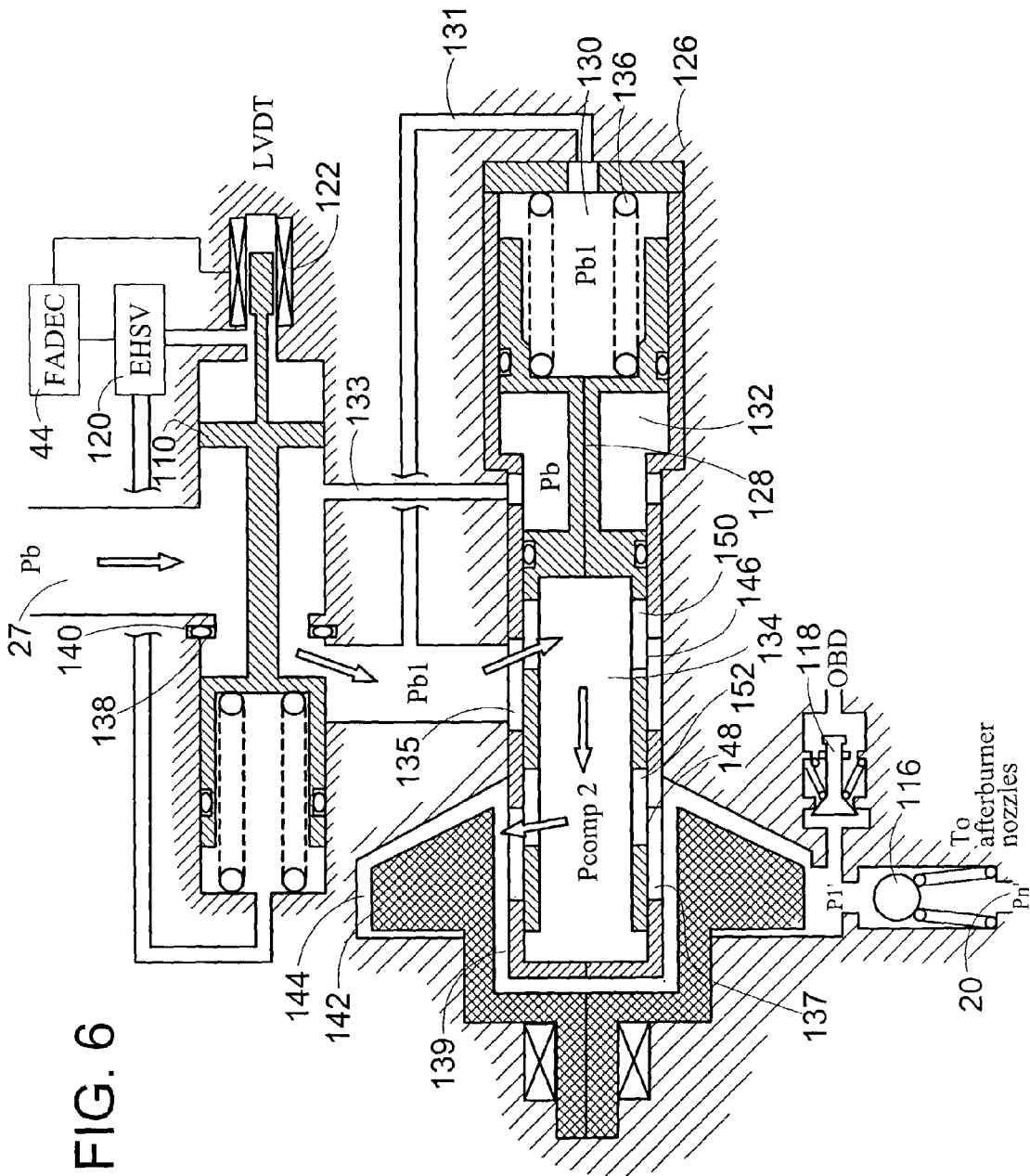
FIG. 6 is a cross sectional view shown partly in schematic form of the fuel metering unit schematically illustrated in FIG. 2 used for a vapor core centrifugal pump and the afterburner of a gas turbine engine.

Another embodiment of the invention is shown in FIGS. 2 and 6, incorporated in an afterburner system for a gas turbine engine 16. The same general principles that apply to the first embodiment likewise generally apply to this embodiment. However, this embodiment demonstrates that many design alterations and different valve arrangements can be made without departing from the present invention.

In this embodiment, a fuel metering valve 110 and a throttle valve 112 are arranged in fluid series upstream of a high speed, high pressure, vapor core centrifugal pump 114. A check valve 116 and an overboard drain valve 118 may be positioned downstream of the pump 114. The metering and shutoff/throttling valves are located at the inlet of the vapor core centrifugal pump rather than the discharge of the pump so the pump can be drained of fuel when the afterburner is not being used. This saves energy and prevents high fuel temperatures in the non-flowing pump. The drained pump is kept rotating at high speed whenever the engine is in operation and it can be brought on-line very quickly by opening the metering valve and throttling/shutoff valve on the pump inlet.

Like the first embodiment, the position of the fuel metering valve 110 is set with an electro-hydraulic servo-valve (EHSV) 120, which is in turn controlled by the full authority digital electronic controller (FADEC) 44 as schematically indicated. Also like the first embodiment, closed loop control is preferably provided over the fuel metering valve 110 with a position sensor indicated as a linear variable displacement transducer (LVDT) 122 providing electronic position feedback to the FADEC 44. The position of the fuel metering valve 110 sets the fuel flow rate flowing through the fuel metering valve 110 to the nozzle outlet passage 20. A pressure drop is also developed across the fuel metering valve 40 during operation (typically in a range of about 30–70 psi but could be much higher) which results a lower pressure Pb1 in a second conduit section 124 of the afterburner system.

The throttle valve 112 is arranged in fluid series with the fuel metering valve 110 and the centrifugal pump 114 to regulate pressure drop across the fuel metering valve 110. In this embodiment, the throttle valve 112 is arranged downstream of the fuel metering valve 110, but upstream of the high pressure centrifugal pump 114. With two different arrangements being shown in different embodiments, it will be appreciated that the throttle valve, pump and fuel metering valve may be arranged in any number of different arrangements in fluid series with one another.

The throttle valve 112 includes a valve body 126 and a movable differential valve piston 128. Like the first embodiment, the valve body 126 may be comprised of an assembly of valve body components. With the valve piston 128 slidably mounted in the valve body 128, the combination defines three chambers 130, 132, 134 which may be in communication with or subjected to different pressures Pb1, Pb and Pcomp2 during operation. In this embodiment (like the first embodiment), a spring 136 is arranged in the Pb1 chamber 130 to urge the valve piston 128 to open the throttling port 148(Andy—The difference has to do with the shutoff function. In the first case the throttling valve provides the shutoff function and the spring first pushes the valve to open the throttling port (62) and then continues to drive the piston to a stop where it then provides shutoff. In the second case the metering valve provides the shutoff function so the throttling valve does not require the shutoff seals.) Fuel shutoff in this embodiment is achieved with the fuel metering valve 110. Specifically, the fuel metering valve 110 is movable against a valve seat 138 which may include an annular seal 140 for shutoff. Also the check valve 116 is arranged prevent fuel leakage to the nozzles when fuel is shut off. There is also no need for a solenoid valve or fluid switch in this embodiment.

Selected porting of the chambers in the throttle valve 112 is provided to control how the throttle valve regulates pressure. The spring chamber 130 is connected by a port and passage 131 to the pressure Pb1 generated between the throttle valve 112 and fuel metering valve 110. The differential chamber 132 is connected by a port and passage 133 to the Pressure Pb experienced upstream of the fuel metering valve 10 in conduit section 27. In this embodiment, the compensation chamber 134 is connected by an inlet port 135 to the main fuel flow passage at pressure Pb1 from the fuel metering valve 110 and an outlet port 137 connected to the core inlet chamber 139 of the centrifugal pump 114. The vapor core centrifugal pump 114 includes a rotor 142 that impels fuel from the core inlet chamber 139 to a radial outlet 144 at pressure P1', which is then communicated through nozzle outlet passage 20 to the afterburner nozzles of the gas turbine engine 16.

As shown in FIG. 6, movement of the differential valve piston 128 opens and closes the inlet and outlet ports 135, 137 for the compensation chamber creating variable restrictions 146, 148 that control the compensation pressure Pcomp2. The differential valve piston 128 includes through-ports 150, 152 that align with the inlet and outlet ports 135, 137 to communicate fuel through the valve piston 128 into and out of the compensation chamber 134. The inlet and outlet ports 135, 137 may be selectively configured in size and shape to control the size of the variable restrictions 146, 148 over the stroke of the valve piston 128. Alternatively (or in addition) the through-ports 150, 152 of the differential valve piston 128 may be selectively configured to control the size of the variable restrictions 146, 148. In either event, and when the throttle valve 112 moves/repositions, the restrictions 144, 146 cause the compensation pressure Pcomp2 to change in a manner that counteracts forces and/or fluid forces to maintain substantially constant the pressure drop across the fuel metering valve 10.

In this embodiment, there is no need for a separate shutoff solenoid, since the metering valve provides the shutoff function. The throttle valve 112 automatically moves to a pressure regulating position when the metering valve opens and sufficient pressure and fuel flow is available from the boost pump.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A fuel system for a gas turbine engine, the fuel system comprising:
   a high pressure centrifugal pump adapted to pump fuel from a fuel supply;
   a fuel metering valve adapted to set a metered flow of fuel;
   a throttle valve adapted to control pressure drop across the fuel metering valve, the throttle valve having at least two variable orifices and a compensation chamber between the variable orifices, the throttle valve being movable to simultaneously change degrees of opening of the variable orifices, the fuel system when in operation adapted to form a fuel pressure in the compensation chamber that acts upon the throttle valve to control position the throttle valve; and
   a nozzle outlet passage adapted to convey fuel to the gas turbine engine for discharge and combustion, wherein the high pressure centrifugal pump, the fuel metering valve, the throttle valve and the nozzle outlet passage are arranged in fluidic series.

2. The fuel system of claim 1, wherein the throttle valve includes a differential valve piston slidable in a valve body, the differential valve piston comprising two different diameters to provide differently sized working surfaces across the throttle valve.

3. The fuel system of claim 2, wherein the differential valve piston further comprising first and second lands in spaced relation such that the throttle valve defines at least three chambers, including a first chamber subjected to fluid pressure upstream of the fuel metering valve, a second chamber subjected to fluid pressure downstream of the fuel metering valve, and the compensation chamber intermediate of the two variable orifices, the compensation chamber arranged in fluidic series with the fuel metering valve and the nozzle outlet passage whereby fuel flows through the compensation chamber toward the nozzle outlet passage.

4. The fuel system of claim 1, wherein the variable orifices change in flow area at different rates when the throttle valve moves between a plurality of positions.

5. The fuel system of claim 4, wherein the variable orifices are in series between the fuel metering valve and the nozzle outlet passage to include an upstream variable orifice and a downstream variable orifice, the upstream variable orifice having a larger flow area than the downstream variable orifice during operation of the throttle valve.

6. The fuel system of claim 1, wherein the throttle valve comprises a spring urging the throttle valve to a closed position preventing fuel from flowing to the nozzle outlet passage.

7. The fuel system of claim 6, further comprising a electrically operated valve fluidically connected to receive a high pressure fuel output from the high pressure centrifugal pump during operation, the electrically operated valve having an on position connecting the high pressure fuel output to an actuation chamber in the throttle valve and a off position disconnecting the actuation chamber from the high pressure fuel output and connecting the actuation chamber to a sump or boost pressure, the high pressure fuel output when initially communicated to the actuation chamber via the on position of the electrically operated valve acting upon the throttle valve against the spring to move the throttle valve from the closed position to an open position, the sump or boost pressure when communicated to the actuation chamber via the off position of the electrically operated valve allowing the spring to move the throttle valve from the open position to the closed position.

8. The fuel system of claim 1, wherein the throttle valve is arranged downstream of the fuel metering valve between the fuel metering valve and the nozzle outlet passage.

9. The fuel system of claim 8, wherein the high pressure centrifugal pump is arranged downstream of the fuel metering valve and the throttle valve, wherein the centrifugal pump is a vapor core pump.

10. The fuel system of claim 1, wherein the high pressure centrifugal pump is arranged upstream of the fuel metering valve and the throttle valve.

11. The fuel system of claim 1, wherein the throttle valve is biased by a spring, the spring providing a variable biasing force determined by the position of the throttle valve, wherein the two variable orifices change in flow area when the throttle valve moves when in operation whereby fluid pressure in the compensation chamber is changed in a predetermined manner determined by a selective sizing of ports for the variable orifices, the change in fluid pressure being correlated to changes in the variable biasing force wherein the variable biasing force and the fluid pressure in the compensation chamber generally increase and decrease in unison.

12. The fuel system of claim 11, wherein changes in fluid pressure in the compensation chamber further compensates for fluid forces such as Bernoulli forces generated when fluid flows through the throttle valve.

13. The fuel system of claim 1, further comprising a servo controller positioning the fuel metering valve.

14. The fuel system of claim 1, wherein the nozzle outlet passage leads to a combustion chamber contained in the gas turbine engine.

15. The fuel system of claim 1, wherein the nozzle outlet passage leads to an after-burner of the gas turbine engine.

16. A fuel system for a gas turbine engine, the fuel system comprising:
   a high pressure centrifugal pump adapted to pump fuel from a fuel supply;
   a fuel metering valve adapted to set a metered flow of fuel;
   a throttle valve adapted to control pressure drop across the fuel metering valve, the throttle valve having a valve body, a valve member movable in the valve body, and a spring biasing the valve member, the spring applying a spring force upon the valve member that changes when the valve member moves;
   means in the throttle valve responding to fuel flow through the throttle valve and for compensating for changes in the spring force as the valve member moves; and
   a nozzle outlet passage adapted to convey fuel to the gas turbine engine for discharge, wherein the centrifugal pump, the fuel metering valve, the throttle valve and the nozzle outlet passage are arranged in fluidic series.

17. The fuel system of claim 16 wherein the compensating means further compensates for fluid flow forces such as Bernoulli forces generated by fuel flow through the throttle valve.

18. The fuel system of claim 16 wherein the compensating means comprises at least two variable orifices in fluid series.

19. The fuel system of claim 18, wherein the variable orifices change in flow area at different rates when the throttle valve moves between a plurality of positions.

20. The fuel system of claim 19, wherein the variable orifices are in series between the fuel metering valve and the nozzle outlet passage to include an upstream variable orifice and a downstream variable orifice, the upstream variable orifice having a larger flow area than the downstream variable orifice during operation of the throttle valve.

21. The fuel system of claim 17, wherein the compensating means comprises a differential valve piston slidable in a valve body, the differential valve piston comprising two different diameters to provide differently sized working surfaces across the throttle valve.

22. The fuel system of claim 21, wherein the differential valve piston further comprising first and second lands in spaced relation such that the throttle valve defines at least three chambers, including a first chamber subjected to fluid pressure upstream of the fuel metering valve, a second chamber subjected to fluid pressure downstream of the fuel metering valve, and the compensation chamber intermediate of two variable orifices formed by the throttle valve, the compensation chamber arranged in fluidic series with the fuel metering valve and the nozzle outlet passage whereby fuel flows through the compensation chamber toward the nozzle outlet passage.

23. The fuel system of claim 16, wherein the spring urges the throttle valve to a closed position preventing fuel from flowing to the nozzle outlet passage.

24. The fuel system of claim 23, further comprising a electrically operated valve fluidically connected to receive a high pressure fuel output from the high pressure centrifugal pump during operation, the electrically operated valve having an on position connecting the high pressure fuel output to an actuation chamber in the throttle valve and a off position disconnecting the actuation chamber from the high pressure fuel output and connecting the actuation chamber to a sump or boost pressure, the high pressure fuel output when initially communicated to the actuation chamber via the on position of the electrically operated valve acting upon the throttle valve against the spring to move the throttle valve from the closed position to an open position, the sump or boost pressure when communicated to the actuation chamber via the off position of the electrically operated valve allowing the spring to move the throttle valve from the open position to the closed position.

25. The fuel system of claim 16, wherein the throttle valve is arranged downstream of the fuel metering valve between the fuel metering valve and the nozzle outlet passage.

26. The fuel system of claim 16, wherein the high pressure centrifugal pump is arranged downstream of a fuel metering valve and the throttle valve, wherein the centrifugal pump is a vapor core pump.

27. The fuel system of claim 16, wherein the high pressure centrifugal pump is arranged upstream of the fuel metering valve and the throttle valve.

28. The fuel system of claim 16, further comprising a servo controller positioning the fuel metering valve.

29. The fuel system of claim 16, wherein the nozzle outlet passage leads to a combustion chamber contained in the gas turbine engine.

30. The fuel system of claim 16, wherein the nozzle outlet passage leads to an after-burner of the gas turbine engine.

* * * * *